Aug. 11, 1959     C. A. BROCK     2,899,216
VACUUM CLEANER HOSE COUPLING HAVING
A RIGIDLY ENCASED RESILIENT BUSHING
Filed Feb. 14, 1956
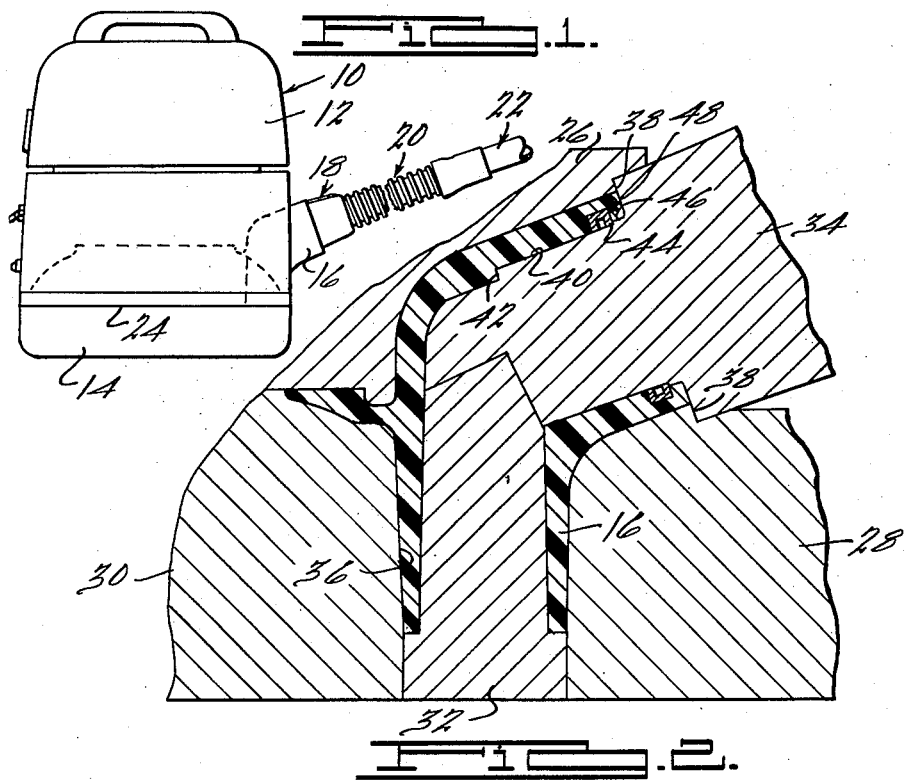
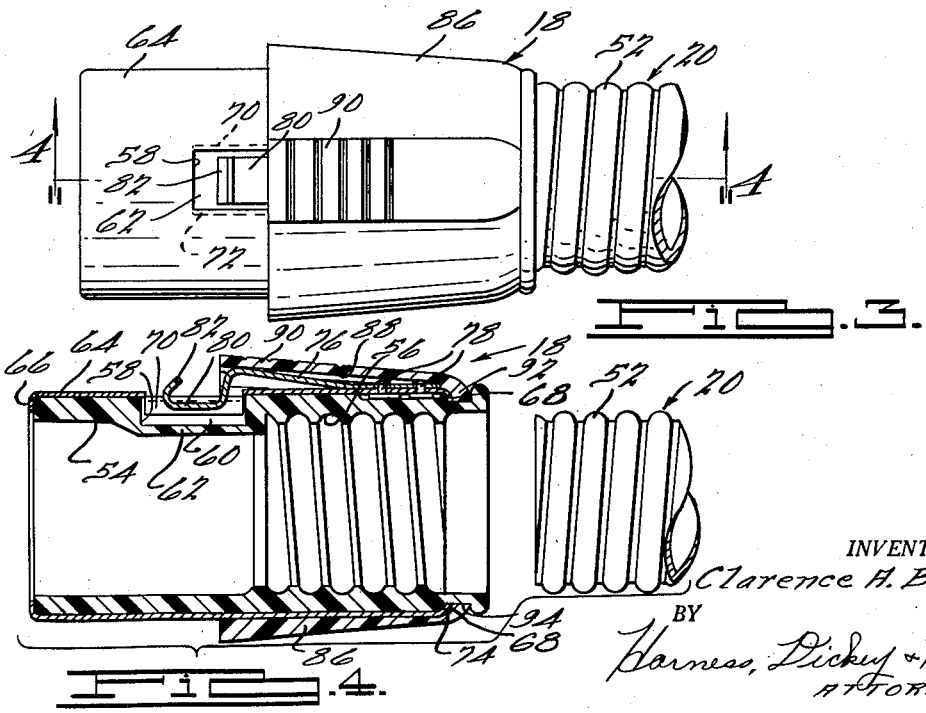
INVENTOR.
Clarence A. Brock
BY
Harness, Dickey & Pierce
ATTORNEYS

United States Patent Office 2,899,216
Patented Aug. 11, 1959

2,899,216

VACUUM CLEANER HOSE COUPLING HAVING A RIGIDLY ENCASED RESILIENT BUSHING

Clarence A. Brock, Toledo, Ohio, assignor, by mesne assignments, to Rexair, Inc., Detroit, Mich., a corporation of Michigan Application February 14, 1956, Serial No. 565,334

1 Claim. (Cl. 285—7)

This invention relates to hose couplings. More particularly, the invention relates to means for detachably securing a hose to a vacuum cleaner and to a method for manufacturing a portion of the coupling assembly.

In customary vacuum cleaner constructions, a readily manipulatable remote wand or nozzle (or a selected one of a series of nozzles) is connected to the vacuum cleaner body by means including a hose. For convenience in use, the hose is normally flexible over at least a substantial portion of its length. For convenience in storage, the hose assembly is customarily readily detachable from the vacuum cleaner body and the nozzle or nozzles are normally readily detachable from the remote end of the hose.

Relatively severe requirements are imposed upon these couplings and particularly upon the coupling between the vacuum cleaner body and the hose. The connection must be sufficiently loose to permit the attaching and detaching to be readily performed, and yet must be sufficiently secure to insure that the hose will not be inadvertently separated from the vacuum cleaner body and to prevent any substantial air leakage past the coupling.

Further problems arise in the securing of one of the two coupling elements to the hose since the amount of clamping force which may be exerted upon the hose is limited due to the flexibility and general lack of rigidity of the hose itself. Further, the imparting of flexibility to a hose has generally resulted in the hose being at least to a degree stretchable and in many types of hoses a large amount of longitudinal extensibility is intentionally provided. As a result, the shearing forces between the hose and the coupling element to which it is attached cannot readily be distributed evenly over those mating surfaces when a pulling force is exerted on the hose. Particularly in those cases where an attempt is made to cement the hose to its coupling element, the pulling force tends to be concentrated at the line where the hose first engages the coupling element and, upon failure in shear of the connection between the coupling element and the hose at that line, the pulling force tends to be concentrated at the next incremental line of contact, and so forth, the hose incrementally and progressively tearing from the coupling element.

An object of this invention is to improve the detachable coupling between a vacuum cleaner body and a vacuum cleaner hose.

Another object of this invention is to improve the methods of manufacture of vacuum cleaner hose couplings.

A manner of accomplishing the foregoing objects, and other objects and features of the invention, will be perceived from the following detailed description of an embodiment of the invention when read with reference to the accompanying drawings in which:

Figure 1 is a perspective view of a portable vacuum cleaner, with its hose in coupled position;

Fig. 2 is a vertical sectional view of a portion of the cleaner construction of Fig. 1 during the process of its manufacture;

Fig. 3 is a plan view of one of the coupling elements employed in the cleaner construction of Fig. 1; and Fig. 4 is a sectional view taken substantially along the line 4—4 of Fig. 3.

While the principles of the invention are applicable to any type of vacuum cleaner construction, they are exemplarily applied to a small portable, so-called "pot" type cleaner such as that represented in Fig. 1 of the drawings. The specific arrangement disclosed in that figure is described in detail in my copending application Serial No. 565,336, filed February 14, 1956, and entitled "Vacuum Cleaner Construction," and reference may be made thereto for a specific description of a suitable environment for the inventive principles herein elucidated.

The vacuum cleaner 10 comprises a canister or body portion 12 detachably secured to a pan assembly 14. Pan assembly 14, which is adapted to receive and contain the dust and dirt collected during the cleaning operation, includes an integral socket or female coupling element 16 adapted to accept the male coupling assembly 18 at the end of flexible hose 20. The remote end of hose 20 is provided with a wand 22 and/or one or more nozzles preferably detachably associated with the hose. In the representative arrangement disclosed in Fig. 1, the pan assembly 14 is formed in two portions, the line 24 representing the line of demarcation between the two portions. The two pan assembly portions are conveniently individually molded of plastic, being subsequently bonded together. The upper portion of pan assembly 14 includes, as an integral portion, the socket or female coupling element 16, so that the entire portion includes a generally cylindrical surface having the socket 16 as a discontinuity therein. This portion is molded as a unit in an appropriately shaped mold and it is a section through that mold, with the molding plastic in place, that is represented in Fig. 2 of the drawings.

The mold includes an upper mold element 26, a lower mold element including outer portion 28 and inner portion 30, a lower core 32 and an upper core 34. At the region of the socket 16, the lower mold element (including portions 28 and 30 which are or may be integral except at the shown section) is provided with socket 36 the upper portion of which is tapered, as shown, and the lower portion of which is cylindrical. The core 32 is insertable within this socket and has a lower cylindrical portion mating with the cylindrical portion of the socket 36 in the lower mold element and an upper tapered portion so that it may readily be removed after molding is completed.

The upper core 34 has a generally cylindrical body portion the leading edge of which is adapted to seat in an annular cavity 38 defined conjointly by the upper mold element 26 and the outer portion 28 of the lower mold element. Cavity 38, of course, defines the ultimate location and orientation of the upper core 34. Upper core 34 is also provided with a forward nose portion including a generally tapered surface 40 which may be provided with a shoulder 42 extending at least partially around its periphery to define, in the finished molded pan assembly, a shoulder against which the innermost end of the male coupling may abut. To provide a latching arrangement which is effective regardless of the rotational relationship between the male and female coupling elements, it is desirable to provide a notched annular metallic bushing 44 embedded in the pan assembly female coupling element 16. While a split ring type of bushing can be inserted in a preformed annular cavity in the female coupling element 16 after molding, it has been found that a much more secure, airtight, and permanent relationship may be achieved between the elements 16 and 44 if they are formed integrally during the molding operation. Therefore, the upper core portion 34 is provided with a shoulder 46 (which need not be as large as shown) against which the bushing 44 is abutted prior to the assembly of upper core 34 into the mold. With the continuous annular bushing 44 in place upon the core 34, the core is brought into the shown position and the molding proceeds in the customary fashion. Upon the completion of molding, the cores 32 and 34 are withdrawn, the upper mold element 26 is removed, and the completed upper pan assembly including female coupling element 16 is lifted from the lower mold element including portions 28 and 30. As a result of this molding operation, the female coupling element 16 is provided with an outer annular edge 48, and a generally tapered socket surface 40 terminating in a shoulder 42, with the bushing 44 being integrally embedded near the outer edge of the female coupling element.

The construction of the male coupling element 18, in its preferred form, is represented in Figs. 3 and 4 of the drawings. While any appropriate type of hose 20 may be employed, it has been found to be advantageous to use a plastic hose in which a metallic coil spring is embedded in order to provide proper flexibility, adequate strength and the capability of extensibility. In its representative form, hose 20 includes an integrally formed helical rib 52 generally semi-circular in cross section. In order that the ribbed hose 20 may be firmly secured to the male coupling element 18, that element includes a central, tubular, resilient bushing 54 the rear portion of which is formed with an internal thread 56 conforming to the shape of the exterior of the hose 20. Bushing 54 is conveniently molded of a resilient material such as rubber. At one point on its periphery and intermediate its ends, bushing 54 is provided with an integrally molded cavity 58 open at its top but otherwise fully enclosed by side walls 60 and base 62 so that air cannot pass into the interior of the bushing through the cavity 58.

Bushing 54 is surrounded by a metallic, tubular body 64 made, for example, of steel. Body 64 is generally circular cylindrical except that both its front and rear edges are rolled inwardly to define front annular lip 66 and rear annular lip 68 and except that at a point on its periphery aligned with cavity 58 in bushing 54, the metal is slit both longitudinally and, over a short distance, circumferentially to define a pair of longitudinal tabs 70 and 72, which are bent radially inwardly of the body 64. In view of the several radially inwardly projecting elements on body 64, resilient bushing 54 must be collapsed to assemble it to the body 64. Upon such assembly, the forward edge of bushing 54 is in abutment with the forward lip 66 on the body 64, a formed shoulder 74 on the bushing 54 is in abutment with the rear lip 68 on the body 64, and the tabs 70 and 72 are in engagement with or proximate to the side walls 60 of the cavity 58 in the bushing 54. Hence, the relationship between the bushing 54 and the body 64 is, after assembly, fixed.

A spring steel latch 76 is secured to the body 64 in any suitable fashion such as by the use of rivets 78. Latch 76 is bent so that it is pretensioned away from the body 64 and is provided with a forward portion 80 extending within the cavity 58 and intermediate the tabs 70 and 72 and terminating in an upwardly extending hook portion 82. The dimensions are such that when latch 76 is depressed, hook 82 will be deflected radially inwardly so that it is at or below the level of the outer surface of the body 64.

An outer sleeve 86 is assembled over the body 64 and the latch 72 and extends forwardly to a point short of the hook portion 82 of the latch 76. The internal surface of the outer sleeve 86 is, for the most part, cylindrical and is of about the same diameter as the body 64 so that it fits snugly thereon. At one point on its periphery and over a substantial portion of its length, the outer sleeve 86 is provided with a tapered cavity 88 as defined by a tapered protuberance 90 on the outer surface of the sleeve 86. The major portion of the latch 76 is disposed within the cavity 88 and underlies the protruding portion 90 of the sleeve 86 when the elements are assembled. Consequently, to depress the hook portion 82 of the latch 76, pressure is applied upon the protuberance 90, the side walls of which are sufficiently thin and of a sufficiently flexible material, such as vinyl plastic, to permit that pressure to act upon the latch 76.

At its rear, sleeve 86 is formed with a radially inwardly extending lip 92 following the contour of the rear lip 68 of the body 64 and engaging a rear peripheral cavity 94 in the bushing 54. If desired, lip 92 may be cemented in cavity 94 to insure permanency of assembly.

It will be appreciated that sleeve 86 is sufficiently resilient so that it can be readily slid into position upon the body 64. It will further be appreciated that while bushing 54 must be collapsed to insert it within the body 64, it will remain rigidly in position once assembled both due to the fact that there are substantially no forces tending to collapse it and due to the fact that the hose 20 exerts forces tending to retain the bushing in normal shape and position.

To assemble the male coupling element 18 into the female coupling element 16, the protruding portion 90 of the sleeve 86 is depressed to move the hook portion 82 of the latch 76 within the cavity 58 in the bushing 54. The forward end of the male coupling element 18 is then inserted within the female element 16 and is advanced until the forward edge of the front lip 66 of the body 64 engages the shoulder 42, the male coupling element being rotated about its longitudinal axis to any position relative to the female coupling element 16. Upon such insertion, the pressure upon the protuberance 90 is relaxed, permitting the hook portion 82 of the latch 76 to move upwardly into engagement with the annular recess in the metallic bushing 44. It will be noted that it is not imperative that the front lip 66 of the body 64 engage shoulder 42, and in commercial practice it may be desirable to establish a sufficient clearance so that hook 82 may readily engage the recess in bushing 44 without the exertion of an undue assembling force upon the male coupling element 18. If desired, the front edge of the sleeve 86 may be brought forwardly so that when the male and female elements are assembled it will engage the end of the female coupling 16, although it has been found that the air seal is adequate without employing such an auxiliary air sealing means.

While it will be apparent that the embodiment of the invention herein disclosed is well calculated to fulfill the objects of the invention, it will be appreciated that the invention is susceptible to modification, variation and change without departing from the proper scope or fair meaning of the subjoined claim.

What is claimed is:

In a vacuum cleaner having a body, a flexible hose, a female coupling element on said body, and a male coupling element on one end of said hose adapted to be engaged within said female coupling element, said male coupling element comprising a resilient tubular bushing, the end of said flexible hose extending within one end of said resilient tubular bushing and having the outer surface thereof secured to the portion of the inner surface of said resilient tubular bushing overlapped thereby, a rigid tubular body disposed over said resilient tubular bushing, said one end of the resilient tubular bushing projecting beyond the end of said rigid body adjacent thereto, a longitudinally extending latch fixed to said rigid body adjacent said one end of the resilient bushing, and a protective outer sleeve encircling said end portion of said rigid tubular body and a portion of said latch and secured to the portion of said one end of the resilient bushing projecting from said rigid tubular body, the portion of said outer sleeve overlying said portion of the latch having an inner tapered longitudinal depression with relatively thin flexible side walls, said outer sleeve terminating at its unsecured end in a transverse plane intermediate the length of said rigid tubular body, an opening in the other end portion of said tubular body into which the free end of said latch projects, said resilient bushing having a recess aligned with said opening and adapted to receive said projecting latch portion, and said resilient bushing sealing said opening against passage of air therethrough.

References Cited in the file of this patent

UNITED STATES PATENTS

| | | |
|---|---|---|
| 873,300 | Cranston | Dec. 10, 1907 |
| 2,135,380 | Benge | Nov. 1, 1938 |
| 2,146,252 | Ell | Feb. 7, 1939 |
| 2,254,611 | Lofgren | Sept. 2, 1941 |
| 2,461,024 | Baumgardner | Feb. 8, 1949 |
| 2,516,883 | Kelly | Aug. 1, 1950 |
| 2,518,426 | Kinander | Aug. 8, 1950 |
| 2,581,837 | Cruise | Jan. 8, 1952 |
| 2,633,603 | Huse | Apr. 7, 1953 |
| 2,702,199 | McDonnell | Feb. 5, 1955 |

FOREIGN PATENTS

| | | |
|---|---|---|
| 353,520 | Great Britain | July 27, 1931 |
| 595,935 | Great Britain | Dec. 23, 1947 |
| 152,839 | Australia | Aug. 23, 1951 |